US009424712B2

(12) United States Patent
Shimabukuro et al.

(10) Patent No.: US 9,424,712 B2
(45) Date of Patent: Aug. 23, 2016

(54) AUTHENTICATING COMPONENTS IN WAGERING GAME SYSTEMS

(75) Inventors: Jorge L. Shimabukuro, Las Vegas, NV (US); Anussorn Veradej, Las Vegas, NV (US); Jun Wang, Las Vegas, NV (US); Gerardus A. Weijers, Henderson, NV (US)

(73) Assignee: BALLY GAMING, INC., Las Vegas, NV (US)

( * ) Notice: Subject to any disclaimer, the term of this patent is extended or adjusted under 35 U.S.C. 154(b) by 946 days.

(21) Appl. No.: 13/000,908

(22) PCT Filed: Jun. 25, 2009

(86) PCT No.: PCT/US2009/048717
§ 371 (c)(1),
(2), (4) Date: Dec. 22, 2010

(87) PCT Pub. No.: WO2009/158538
PCT Pub. Date: Dec. 30, 2009

(65) Prior Publication Data
US 2011/0117984 A1 May 19, 2011

Related U.S. Application Data

(60) Provisional application No. 61/076,389, filed on Jun. 27, 2008.

(51) Int. Cl.
| *G06Q 30/00* | (2012.01) |
| *G07F 17/32* | (2006.01) |
| *G06Q 30/02* | (2012.01) |

(52) U.S. Cl.
CPC ........... *G07F 17/3223* (2013.01); *G06Q 30/00* (2013.01); *G06Q 30/02* (2013.01); *G07F 17/32* (2013.01); *G07F 17/323* (2013.01); *G07F 17/3241* (2013.01)

(58) Field of Classification Search
CPC ....................................................... G06Q 30/00
USPC ............. 705/50, 67; 713/188–189, 192–194; 380/251; 463/1, 29, 42–43; 725/2
See application file for complete search history.

(56) References Cited

U.S. PATENT DOCUMENTS

| 4,072,930 A | 2/1978 | Lucero et al. |
| 4,405,829 A | 9/1983 | Rivest et al. |

(Continued)

FOREIGN PATENT DOCUMENTS

| GB | 2121569 A | 12/1983 |
| WO | WO9965579 | 12/1999 |

(Continued)

OTHER PUBLICATIONS

"PCT Application No. PCT/US09/48717 International Preliminary Report on Patentability", Sep. 8, 2010, 10 pages.

(Continued)

*Primary Examiner* — Arthur Duran
(74) *Attorney, Agent, or Firm* — DeLizio Law, PLLC (57) ABSTRACT

In some embodiments, a processor includes a plurality of local stores configured to store wagering game assets and at least part of a wagering game controller, and to store authentication keys for use in authenticating the wagering game controller and the wagering game assets; a plurality of processing elements, wherein each processing element is coupled to one of the local stores, each processing element configured to present wagering games by executing the wagering game controller; at least one authentication controller including hardware configured to authenticate, using the authentication keys, the wagering game controller and wagering game assets; a storage device in communication with the processor, the storage device configured to store the wagering game controller and wagering game assets, wherein the wagering game assets include audio and video content for use in presenting the wagering games.

7 Claims, 8 Drawing Sheets

(56) References Cited

U.S. PATENT DOCUMENTS

| | | |
|---|---|---|
| 4,607,844 A | 8/1986 | Fullerton |
| 4,727,544 A | 2/1988 | Brunner et al. |
| 5,155,768 A | 10/1992 | Matsuhara |
| 5,231,668 A | 7/1993 | Kravitz |
| 5,326,104 A | 7/1994 | Pease et al. |
| 5,643,086 A | 7/1997 | Alcorn et al. |
| 5,644,704 A | 7/1997 | Pease et al. |
| 5,668,945 A | 9/1997 | Ohba et al. |
| 5,707,286 A | 1/1998 | Carlson |
| 5,737,418 A | 4/1998 | Saffari et al. |
| 5,768,382 A | 6/1998 | Schneier et al. |
| 5,871,398 A | 2/1999 | Schneier et al. |
| 5,970,143 A | 10/1999 | Schneier et al. |
| 5,971,851 A | 10/1999 | Pascal et al. |
| 6,071,190 A | 6/2000 | Weiss et al. |
| 6,099,408 A | 8/2000 | Schneier et al. |
| 6,106,396 A | 8/2000 | Alcorn et al. |
| 6,149,522 A | 11/2000 | Alcorn et al. |
| 6,203,427 B1 | 3/2001 | Walker et al. |
| 6,264,557 B1 | 7/2001 | Schneier et al. |
| 6,364,769 B1 | 4/2002 | Weiss et al. |
| 6,402,614 B1 | 6/2002 | Schneier et al. |
| 6,409,602 B1 | 6/2002 | Wiltshire et al. |
| 6,450,885 B2 | 9/2002 | Schneier et al. |
| 6,488,581 B1 | 12/2002 | Stockdale |
| 6,488,585 B1* | 12/2002 | Wells et al. ............ 463/43 |
| 6,527,638 B1 | 3/2003 | Walker et al. |
| 6,565,443 B1 | 5/2003 | Johnson et al. |
| 6,595,856 B1 | 7/2003 | Ginsburg et al. |
| 6,607,439 B2 | 8/2003 | Schneier et al. |
| 6,620,047 B1 | 9/2003 | Alcorn et al. |
| 6,629,184 B1 | 9/2003 | Berg et al. |
| 6,645,077 B2 | 11/2003 | Rowe |
| 6,675,152 B1 | 1/2004 | Prasad et al. |
| 6,685,567 B2 | 2/2004 | Cockerille et al. |
| 6,722,986 B1 | 4/2004 | Lyons et al. |
| 6,823,419 B2 | 11/2004 | Berg et al. |
| 6,875,109 B2 | 4/2005 | Stockdale |
| 6,918,831 B2 | 7/2005 | Nguyen et al. |
| 6,926,605 B2 | 8/2005 | Nguyen et al. |
| 6,935,946 B2* | 8/2005 | Yoseloff et al. ............ 463/16 |
| 6,935,952 B2 | 8/2005 | Walker et al. |
| 6,942,570 B2 | 9/2005 | Schneier et al. |
| 6,961,852 B2* | 11/2005 | Craft ............ 713/168 |
| 6,962,530 B2 | 11/2005 | Jackson |
| 6,964,611 B2 | 11/2005 | Packes, Jr. et al. |
| 7,008,318 B2 | 3/2006 | Schneier et al. |
| 7,043,641 B1 | 5/2006 | Martinek et al. |
| 7,062,470 B2 | 6/2006 | Prasad et al. |
| 7,063,615 B2 | 6/2006 | Alcorn et al. |
| RE39,368 E | 10/2006 | Alcorn et al. |
| RE39,369 E | 10/2006 | Alcorn et al. |
| RE39,370 E | 10/2006 | Alcorn et al. |
| 7,116,782 B2 | 10/2006 | Jackson et al. |
| 7,125,017 B2 | 10/2006 | LaPorte et al. |
| RE39,400 E | 11/2006 | Alcorn et al. |
| RE39,401 E | 11/2006 | Alcorn et al. |
| 7,137,893 B2 | 11/2006 | Canterbury |
| 7,162,036 B2 | 1/2007 | Rowe |
| 7,177,428 B2 | 2/2007 | Gordon et al. |
| 7,179,170 B2 | 2/2007 | Martinek et al. |
| 2002/0049909 A1 | 4/2002 | Jackson et al. |
| 2003/0008704 A1 | 1/2003 | Gauselmann |
| 2003/0028779 A1 | 2/2003 | Rowe |
| 2003/0195033 A1 | 10/2003 | Gazdic et al. |
| 2003/0216172 A1 | 11/2003 | LeMay et al. |
| 2003/0221114 A1* | 11/2003 | Hino et al. ............ 713/189 |
| 2004/0002381 A1 | 1/2004 | Alcorn et al. |
| 2004/0003262 A1* | 1/2004 | England et al. ............ 713/189 |
| 2004/0038740 A1 | 2/2004 | Muir |
| 2004/0043820 A1 | 3/2004 | Schlottmann |
| 2004/0127277 A1* | 7/2004 | Walker et al. ............ 463/16 |
| 2004/0210568 A1 | 10/2004 | Makus et al. |
| 2004/0243848 A1 | 12/2004 | Blackburn et al. |
| 2004/0248646 A1 | 12/2004 | Canterbury |
| 2004/0259633 A1 | 12/2004 | Gentles et al. |
| 2004/0259643 A1 | 12/2004 | Gentles |
| 2005/0009599 A1 | 1/2005 | Ryan |
| 2005/0020356 A1 | 1/2005 | Cannon |
| 2005/0021944 A1* | 1/2005 | Craft et al. ............ 713/161 |
| 2005/0143171 A1 | 6/2005 | Loose |
| 2006/0035703 A1 | 2/2006 | Nguyen et al. |
| 2006/0035708 A1 | 2/2006 | Nguyen et al. |
| 2006/0116208 A1* | 6/2006 | Chen et al. ............ 463/43 |
| 2006/0240888 A1 | 10/2006 | Tanimura |
| 2006/0247004 A1 | 11/2006 | Tanimura |
| 2006/0247005 A1 | 11/2006 | Tanimura |
| 2006/0247020 A1 | 11/2006 | Fujimori |
| 2006/0264256 A1 | 11/2006 | Gagner et al. |
| 2007/0021194 A1 | 1/2007 | Aida |
| 2007/0021195 A1 | 1/2007 | Campbell et al. |
| 2007/0026942 A1 | 2/2007 | Kinsley et al. |
| 2007/0179904 A1 | 8/2007 | Hofstee et al. |
| 2007/0180271 A1* | 8/2007 | Hatakeyama et al. ......... 713/193 |
| 2008/0009344 A1* | 1/2008 | Graham et al. ............ 463/25 |
| 2008/0065907 A1* | 3/2008 | Nutter et al. ............ 713/193 |
| 2008/0091934 A1* | 4/2008 | Peterson et al. ............ 713/2 |
| 2008/0235754 A1* | 9/2008 | Wiseman et al. ............ 726/1 |
| 2008/0254880 A1* | 10/2008 | Dreyer et al. ............ 463/31 |
| 2009/0086981 A1* | 4/2009 | Kumar et al. ............ 380/285 |
| 2009/0104965 A1* | 4/2009 | House et al. ............ 463/20 |

FOREIGN PATENT DOCUMENTS

| | | |
|---|---|---|
| WO | WO2005029272 | 3/2005 |
| WO | WO2009158538 | 12/2009 |

OTHER PUBLICATIONS

"PCT Application No. PCT/US09/48717 International Search Report", Aug. 7, 2009, 8 pages.

Shimizu, Kanna, "The Cell Broadband Engine Processor Security Architecture", http://www.ibm.com/developerworks/power/library/pa-cellsecurity/ (Date Obtained from the Internet: May 14, 2008) Apr. 24, 2006, 9 pages.

\* cited by examiner

AUTHENTICATING COMPONENTS IN WAGERING GAME SYSTEMS

RELATED APPLICATIONS

This application claims the priority benefit of U.S. Provisional Application Ser. No. 61/076,389 filed Jun. 27, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to authenticating components in wagering game systems.

BACKGROUND

A wide variety of computerized wagering game machines are now available to casino operators and players. Computerized wagering game machines range from slot machines to games that are traditionally played live, such as poker, blackjack, roulette, etc. These computerized wagering game machines provide many benefits to game owners and players, including increased reliability over mechanical machines, greater game variety, improved sound and animation, and lower overall management cost.

Typically, when wagering game machines start-up, they take measures for ensuring that their hardware and software components have not been modified or tampered-with. Thus, wagering game machines typically include software for verifying digital signatures of the machine's other software. One drawback of using one software component to authenticate another is that the software authentication component itself is vulnerable to attack. For example, software authentication components may be attacked and modified when they are loaded into main memory from a storage medium (e.g., a hard disk drive, ROM, etc.). If a wagering game machine's software authentication components are compromised, the entire system cannot be trusted.

Some wagering game machines authenticate every software component on the machine before executing any single component. After every component is authenticated, the machine may begin executing software components. However, before executing each component, the machine may authenticate the component yet again to confirm that it has not been modified. Such an authentication scheme delays the initialization process, leaving players waiting for machines to "come on-line." Moreover, such an authentication scheme would not detect whether software components have been modified while they execute.

SUMMARY

In some embodiments, a wagering game machine comprises a processor includes, a plurality of local stores configured to store wagering game assets and at least part of a wagering game controller, and to store authentication keys for use in authenticating the wagering game controller and the wagering game assets; a plurality of processing elements, wherein each processing element is coupled to one of the local stores, each processing element configured to present wagering games by executing the wagering game controller; at least one authentication controller including hardware configured to authenticate, using the authentication keys, the wagering game controller and wagering game assets; a storage device in communication with the processor, the storage device configured to store the wagering game controller and wagering game assets, wherein the wagering game assets include audio and video content for use in presenting the wagering games.

In some embodiments, the processor is further configured to authenticate the wagering game controller in an isolation mode during which the wagering game controller is inaccessible to all but one of the processing elements.

In some embodiments, the authentication controller is configured to authenticate the wagering game controller and wagering game assets without assistance from a software authenticator.

In some embodiments, the authentication controller is configured to periodically authenticate the wagering game controller and wagering game assets as the wagering game controller is executing on one of the processing elements.

In some embodiments, the authentication keys include digital signatures associated with the wagering game controller and wagering game assets.

In some embodiments, a method for authenticating wagering game modules in a wagering game machine that includes a processor having authentication hardware configured to authenticate the wagering game software, the method comprises authenticating, using the authentication hardware, a loader module, wherein the loader module is configured to enable the wagering game machine to receive modules over a network; configuring, by executing the loader module, the wagering game machine to receive the wagering game modules over a network; receiving, under control of the loader module, a first wagering game controller module configured to present wagering games during execution on the wagering game machine; determining, using the processor's authentication hardware, that the first wagering game controller module is not authentic, the determining occurring before the wagering game machine includes one or more other modules required for presentation of the wagering games; requesting, under control of the loader module, a second wagering game controller module before receipt of the one or more other modules required for presentation of wagering games; receiving the second wagering game controller module; and determining, using the processor's authentication hardware, that the second wagering game controller module is authentic.

In some embodiments, the loader module is not part of the wagering game operating system.

In some embodiments, the method further comprises receiving the one or more other modules required for presentation of wagering games; determining, using the processor's authentication hardware, that the one or more other modules are authentic; and executing the one or more other modules and the wagering game controller module.

In some embodiments, the receiving of the one or more modules and the receiving of the second wagering game controller module overlap in time.

In some embodiments, the processor's authentication hardware includes, before receipt of the first wagering game controller module, one or more authentication keys associated with the first and second wagering game controller modules.

In some embodiments, a machine-readable medium including instructions which when executed by a machine cause the machine to perform operations comprises initializing a wagering game machine to present wagering games, wherein the initializing includes authenticating and executing a BIOS module and a wagering game operating system; executing, in first processor core, a first wagering game controller, wherein the executing includes using a first group of wagering game assets to present a first group of wagering games; receiving, over a wagering game network, a second wagering game controller and second group of wagering game assets; halting the execution of the first wagering game controller in the first processor core; isolating the second wagering game controller in a second processor core, wherein the isolating renders the second wagering game controller inaccessible to all other software outside the second processor core; authenticating, the second wagering game controller using authentication hardware included in the second processor core; and executing, in the second processor core, the second wagering game controller, wherein the executing includes using the second group of wagering game assets to present a second group of wagering games.

In some embodiments, the initializing the wagering game machine includes authenticating the BIOS module and the wagering game operating system using authentication hardware included in the first processor core.

In some embodiments, the wagering game assets include audio content and video content for use in presenting the wagering games.

In some embodiments, the second processor core includes a local store and a processing element.

In some embodiments, a wagering game system comprises a wagering game server to provide a loader module and a wagering game operating system over a wagering game network; a first wagering game machine to provide, over the wagering game network, wagering game assets to other wagering game machines of the wagering game system; a second wagering game machine configured to a receive, over the wagering game network, the loader module from the wagering game server, to authenticate the loader module using authentication hardware included in a central processing unit, to execute the loader module, wherein the loader module is configured to receive and authenticate, using the authentication hardware, the wagering game assets, and to receive and authenticate the wagering game operating system after authentication of the wagering game asset, and to execute the operating system and present wagering games using the wagering game assets.

In some embodiments, the first wagering game machine further configured to provide the wagering game assets upon request.

In some embodiments, the second wagering game machine is portable and the first wagering game machine is stationary.

In some embodiments, receipt of the loader module and the wagering game operating system to occur after checkout of the second wagering game machine from a kiosk.

In some embodiments, authentication of the wagering game assets occurs in isolation from all other components of the second wagering game machine.

In some embodiments, an apparatus comprises means for receiving wagering game software over a wagering game network; means for authenticating the wagering game software without assistance of software authentication logic that is not embedded in a processor; means for storing the wagering game software and authentication keys for use in authenticating the wagering software; means for fetching and executing the wagering game software for presenting wagering games, wherein the fetching and executing occurs in isolation from other components of the apparatus; and means for encrypting, without assistance from software encryption logic, the wagering game software while in isolation from the other components of the apparatus.

In some embodiments, the means for fetching and executing includes means for ending the isolated execution of the wagering game software.

In some embodiments, the wagering game software includes a wagering game controller including logic for presenting wagering games.

In some embodiments, the means for fetching and executing includes means for prompting re-authentication, during execution, of the wagering game software using the means for authenticating.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes an example operating environment. The third section describes example operations performed by some embodiments and the fourth section describes example wagering game machines in more detail. The fifth section presents some general comments.

Introduction

This section provides an introduction to some embodiments of the invention.

As noted above, some wagering game machines (also referred to herein as "machines") use software to authenticate components in a particular order. In some instances, the machines follow an authentication order because certain components are needed by other components. For example, wagering game operating systems may require that BIOS be loaded before the operating system can function properly. As a result, some machines may first load and authenticate BIOS, and then authenticate other components. Because BIOS may be the first software loaded and executed, BIOS likely authenticates itself. That is, BIOS may include code designed to authenticate the entire BIOS code. However, because the BIOS software can be modified to return bogus authentication results, the wagering game machine's root of trust may be suspect. As wagering game machines progress through the initialization process, other components (e.g., the wagering game operating system) may take over authentication operations. As initialization progresses, a plurality of different components may self-authenticate and/or reside in memory waiting to authenticate other components. Thus, some machines have several times at which their software authentication code is vulnerable to attack. Some embodiments of the inventive subject matter enable machines to avoid these vulnerabilities by authenticating wagering game software using authentication logic native to the machine's processor. These embodiments are more resistant to attack, as the rogue software cannot modify a processor's native authentication hardware.

Figure 1:
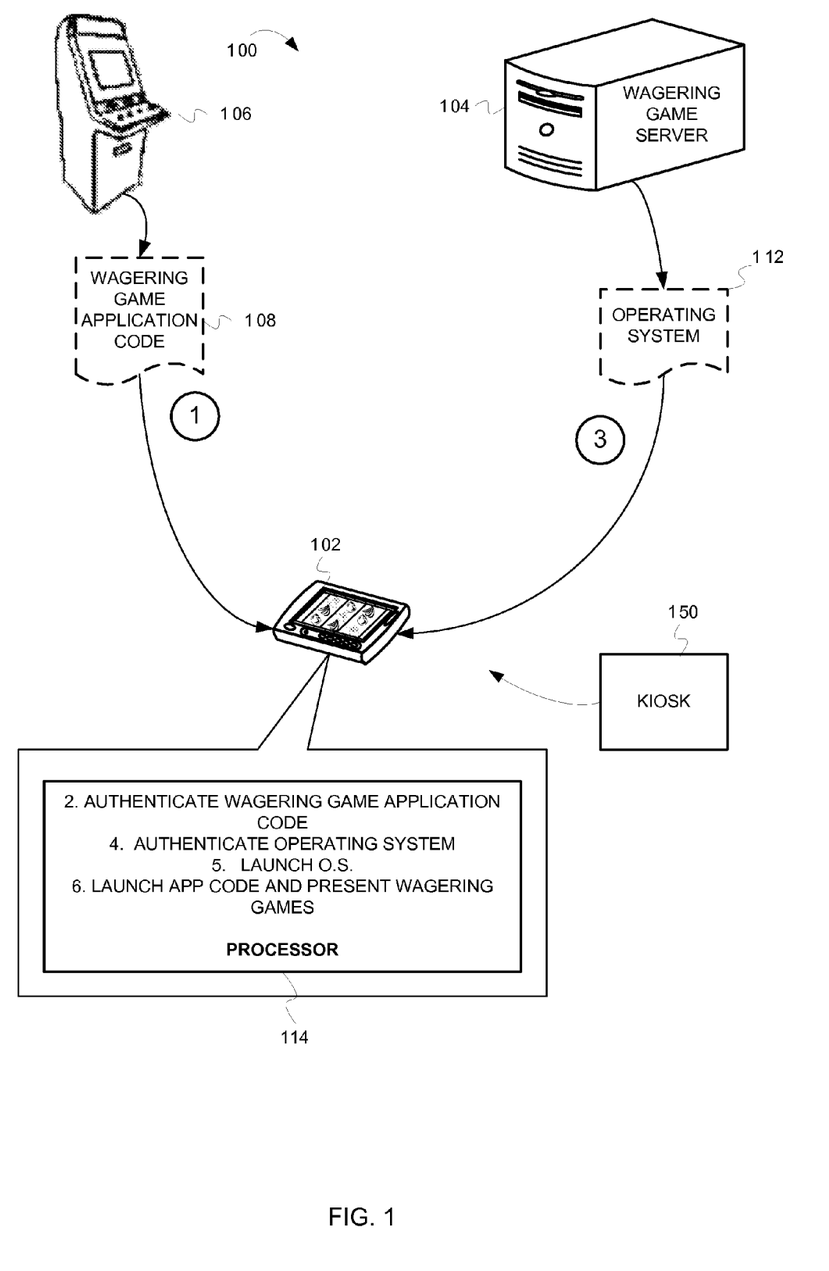
FIG. 1 is a dataflow diagram illustrating a wagering game machine capable of authenticating components in varying order, according to some embodiments of the invention.

Because some authentication schemes are tied to the manner in which wagering game machines initialize (e.g., as described directly above), a machine's authentication process may be restricted to a particular order. In many gaming environments, ordered authentication provides satisfactory performance. For example, ordered authentication may be suitable for machines that do not frequently change games and components. However, ordered authentication may be less attractive in networked gaming environments, where mobile machines constantly reboot and download new games and different components. In networked gaming environments, mobile machines may receive components from various sources over wireless networks. Because network traffic often arrives at different times (e.g., because of network traffic, topology, utilization, etc.) mobile machines may receive components in any order. Mobile machines using ordered authentication may have to wait for certain components to arrive before they can proceed through the ordered authentication process. For example, for a mobile machine using ordered authentication, if the machine first receives game assets, the machine would wait until it received an operating system or other necessary software component (e.g., game services software, device drivers, etc.) before commencing the authentication process. Some embodiments of the inventive subject matter enable wagering game machines to authenticate components in any order. FIG. 1 illustrates this concept.

FIG. 1 is a dataflow diagram illustrating a wagering game machine capable of authenticating components in varying order, according to some embodiments of the invention. In FIG. 1, a networked gaming environment 100 includes a mobile wagering game machine 102, wagering game server 104, and stationary wagering game machine ("stationary machine") 106. In the networking environment 100, players check-out the mobile machine 102 from a kiosk 150. Before checkout, the mobile machine 102 may include only minimal software components, such as components for performing network authentication and booting. During checkout, players may select one or more wagering games for the mobile machine 102. After checkout, the mobile machine 102 can download whenever components are needed for presenting the wagering game machines. For simplicity, the download process shown in FIG. 1 shows the mobile machine 102 downloading only two components. The following discussion explains how the mobile machine 102 can download the needed components and authenticate them in any order. In some embodiments, the mobile machine 102 includes a processor including authentication hardware that facilitates any-order authentication.

In FIG. 1, the download and authentication process occurs in several stages. During stage one, the mobile machine 102 receives wagering game application code 108 from the stationary machine 106. Although FIG. 1 shows the mobile machine 102 receiving the application code 108 from a stationary machine 106, the mobile machine may receive the application code from other network components. During stage two, although the mobile machine 102 is not ready to launch the application code 108 (e.g., because the application code 108 requires an operating system for execution), the mobile machine 102 authenticates the application code 108. In some instances, before the mobile machine 102 can execute application code 108, it may need a plurality of software components, such as game services, device drivers, etc. (although not shown in this example).

During stage three, the mobile machine 102 receives an operating system 112 from the server 104. During stage four, the mobile machine 102 authenticates the operating system. During stages five and six, the mobile machine 102 launches the operating system, launches the wagering game application code 108, and presents wagering games (respectively). Because the mobile machine 102 can authenticate components in any order, it can avoid idle time associated with ordered authentication. For example, if a component is not authentic, the mobile machine 102 can attempt to procure an authentic version before the component is needed for execution. In some instances, the mobile machine 102 may go into a tilt mode (halting operations) and notify network administrators about the rogue code.

The various features noted above are not limited to mobile machines, as stationary machines and other devices connected to a wagering game networks can include one or more of such features. Although FIG. 1 describes some embodiments, the following sections describe many other features and embodiments.

Operating Environment

This section describes an example operating environment and presents structural aspects of some embodiments. This section includes discussion about wagering game machine architectures and wagering game networks.

Wagering Game Machine Architectures

Figure 2:
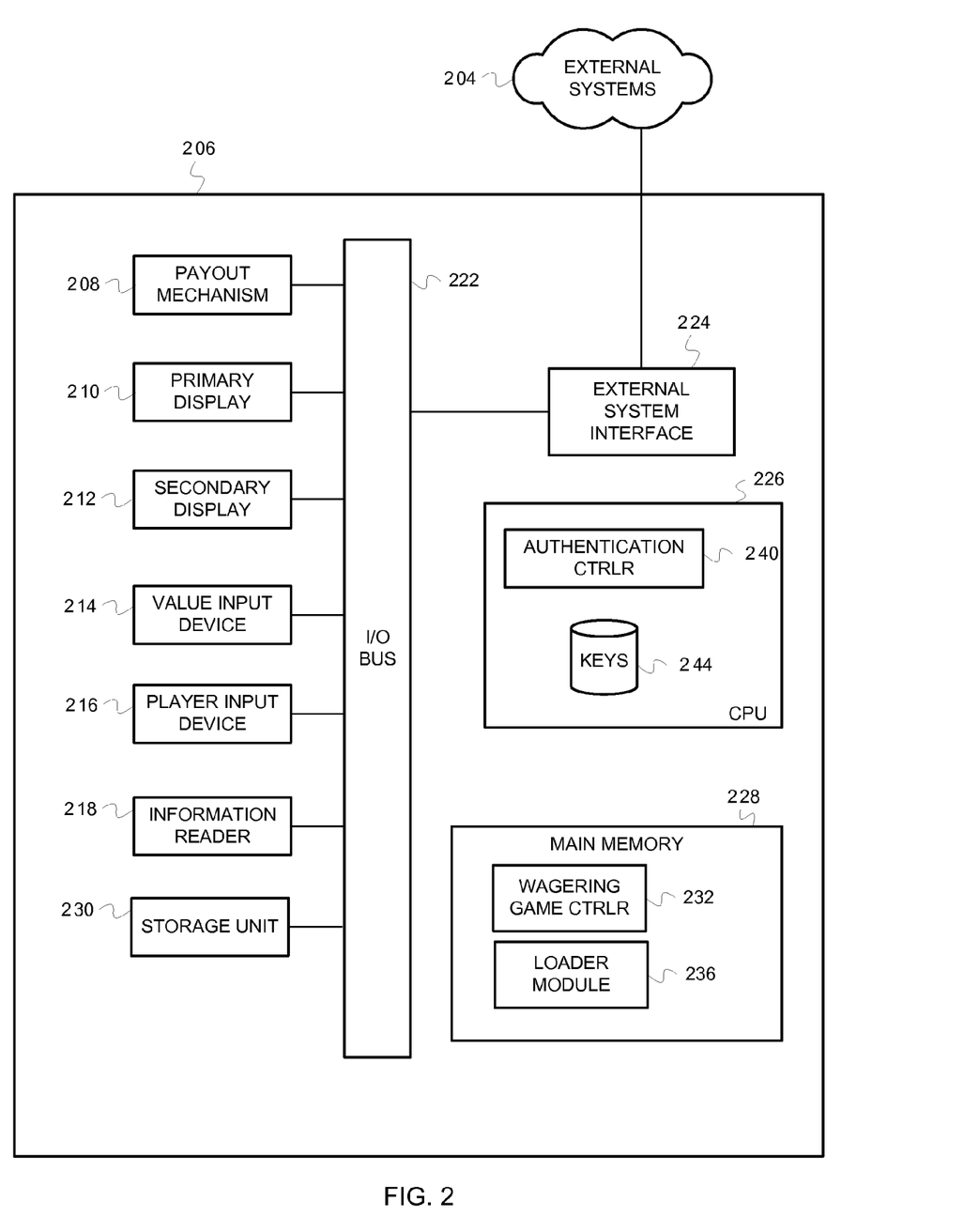
FIG. 2 is a block diagram illustrating a wagering game machine, according to example embodiments of the invention.
Figure 3A:
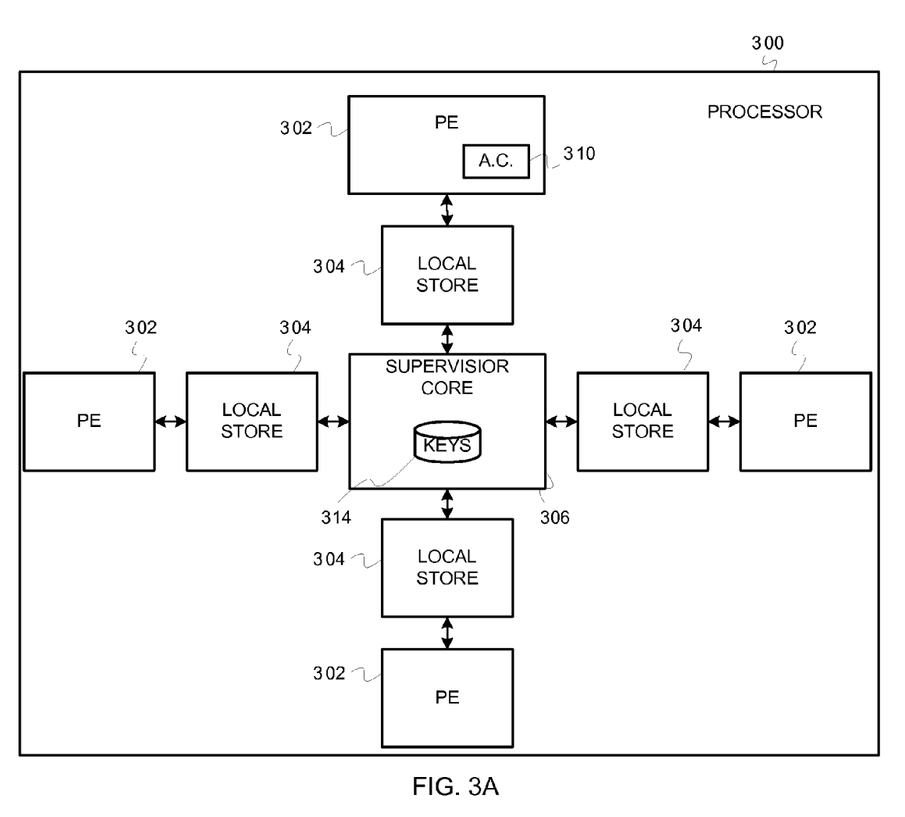
FIG. 3A is a block diagram illustrating a processor suitable for use with some embodiments of the invention.

FIG. 2 is a block diagram illustrating a wagering game machine, according to example embodiments of the invention. As shown in FIG. 2, a wagering game machine 206 includes a central processing unit (CPU) 226 connected to main memory 228. The CPU 226 includes hardware support for authentication and encryption. As shown, the CPU 226 includes an authentication controller 240 and key store 244. The authentication controller 240 can authenticate the machine's software components without assistance from other software components. In some embodiments, the authentication controller 240 can itself compare a software component's digital signature with a digital signature stored in the key store 244. Additionally, the authentication controller 242 can itself decrypt/encrypt software and data. Thus, the CPU 226 enables the wagering game machine 206 to authenticate components in any order. Additional CPU features are described below (see discussion of FIG. 3).

The main memory 228 includes a wagering game controller 232 and a loader module 236. In one embodiment, the wagering game controller 232 can present wagering games, such as video poker, video black jack, video slots, video lottery, etc., in whole or part. In some instances, the wagering game controller 232 includes a random number generator with which it can determine outcome of the wagering games. The loader module 236 can configure the wagering game machine 206 to receive software components over a wagering game network. The loader module 236 can operate without assistance from other software, such as BIOS, an operating system, etc. In some embodiments, the loader module 236 includes logic for communicating with network components (e.g., wagering game servers, etc.), storing wagering game software and data received over the network, and launching wagering game software components. Although not shown, the main memory 228 can include other components, such as BIOS code, wagering game assets (e.g., media files, pay tables, etc.), etc.

The CPU 226 is also connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 2 describes an example wagering game machine architecture, this section continues by discussing processors that can be used with some embodiments of the invention.

FIG. 3A is a block diagram illustrating a processor suitable for use with some embodiments of the invention. In FIG. 3A, a processor 300 includes a supervisor core 306 connected to a plurality of local stores 304, each of which is connected to a processing element 302. Each processing element 302 & local store 304 pair can independently execute software for carrying out different wagering game processes, such as determining wagering game results, rendering wagering game graphics and audio, and perform other wagering game tasks. Each local store 304 can be any suitable size (e.g., 256 kilobytes) and can be private to a particular processing element. In some embodiments, before software code is executed by a processing element 302, the software code and any associated data are placed into a local store 304. When executing the software code, the processing element 302 can fetch software code and data from only the local store (avoiding accesses to main memory).

As shown, at least one of the processing elements 302 includes an authentication controller 310. In some embodiments, the authentication controller 310 includes hardware logic for authenticating digital signatures of software that will execute on the processing element 302. In some embodiments, the authentication controller 310 can be implemented in microcode embedded in the processor 300. In any case, the authentication controller 310 can include logic for executing any suitable algorithm (e.g. RSA, etc.) for validating security credentials (e.g., digital signatures) and performing encryption.

Each processing element and local store pair can be referred to as a "processing core" or "core". The processor 300 can include any number of processing cores (e.g., 8, 16, etc.).

Figure 3B:
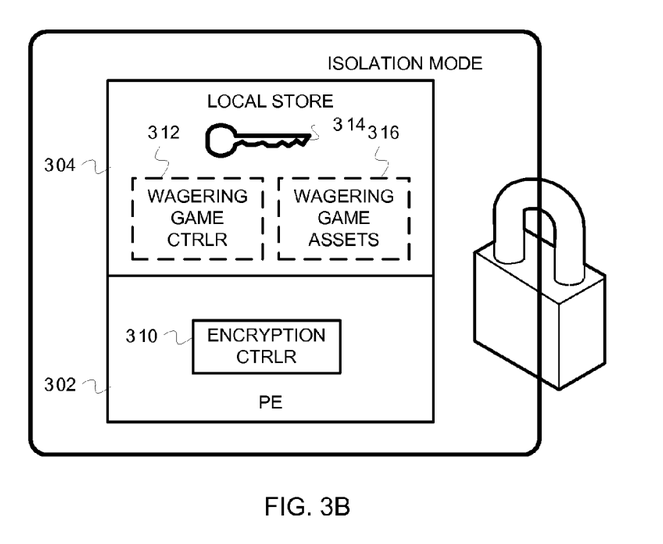
FIG. 3B is a block diagram showing how processing elements can operate in a secure isolation mode, according to some embodiments of the invention.

FIG. 3B is a block diagram showing how processing elements can operate in a secure isolation mode, according to some embodiments of the invention. Each processing element and local store pair can operate in isolation from the rest of the wagering game machine. In isolation mode, a processing element's local store 304, which contains wagering game software code and data (e.g., wagering game controller 312 & wagering game assets 316), is locked for the processing element's use only and cannot be read or written by any other component. Moreover, administrative control processes may be disabled during isolation mode. In some embodiments, once a processing element is isolated, the only external action that can affect the processing element 302 is cancellation of the processing element's task, which erases all information in the local store and processing element.

The processor 300 can utilize isolation mode to securely execute wagering game code. After the wagering game controller 312 and wagering game assets 316 are loaded into the local store 304 in isolation mode, no other software executing on the processor 300 can attack or otherwise alter them. Thus, they can securely present wagering games on a mobile machine or other wagering game machine. In some embodiments, the processor 300 can take isolation mode a step further. That is, after entering isolation mode, a processing element can use its authentication controller 310 to authenticate wagering game software and data. In some embodiments, before entering isolation mode, the supervisor core 306 (or other processor component) securely delivers authentication keys 314 to a local store. In turn, the processing element's authentication controller 310 uses the keys 314 to authenticate the wagering game software and data. Operations for authenticating wagering game components in isolation mode are described in more detail below. Because the wagering game machine's processor can isolate wagering game code and authenticate it with hardware components, the wagering game machine is much less vulnerable to attacks (e.g., because rogue code cannot modify the hardware of the authentication controller 310). Furthermore, isolation mode can facilitate flexible authentication schemes, such as any-order authentication, on-demand authentication, etc. The following sections will describe such authentication schemes in more detail.

In some embodiments a plurality of processing cores can operate together in isolation mode. For example, two cores can execute a wagering game controller in isolation, while other cores execute other code. When cores operate together in isolation mode, they can share data between themselves while being inaccessible to all other processor components.

Wagering Game Networks

Figure 4:
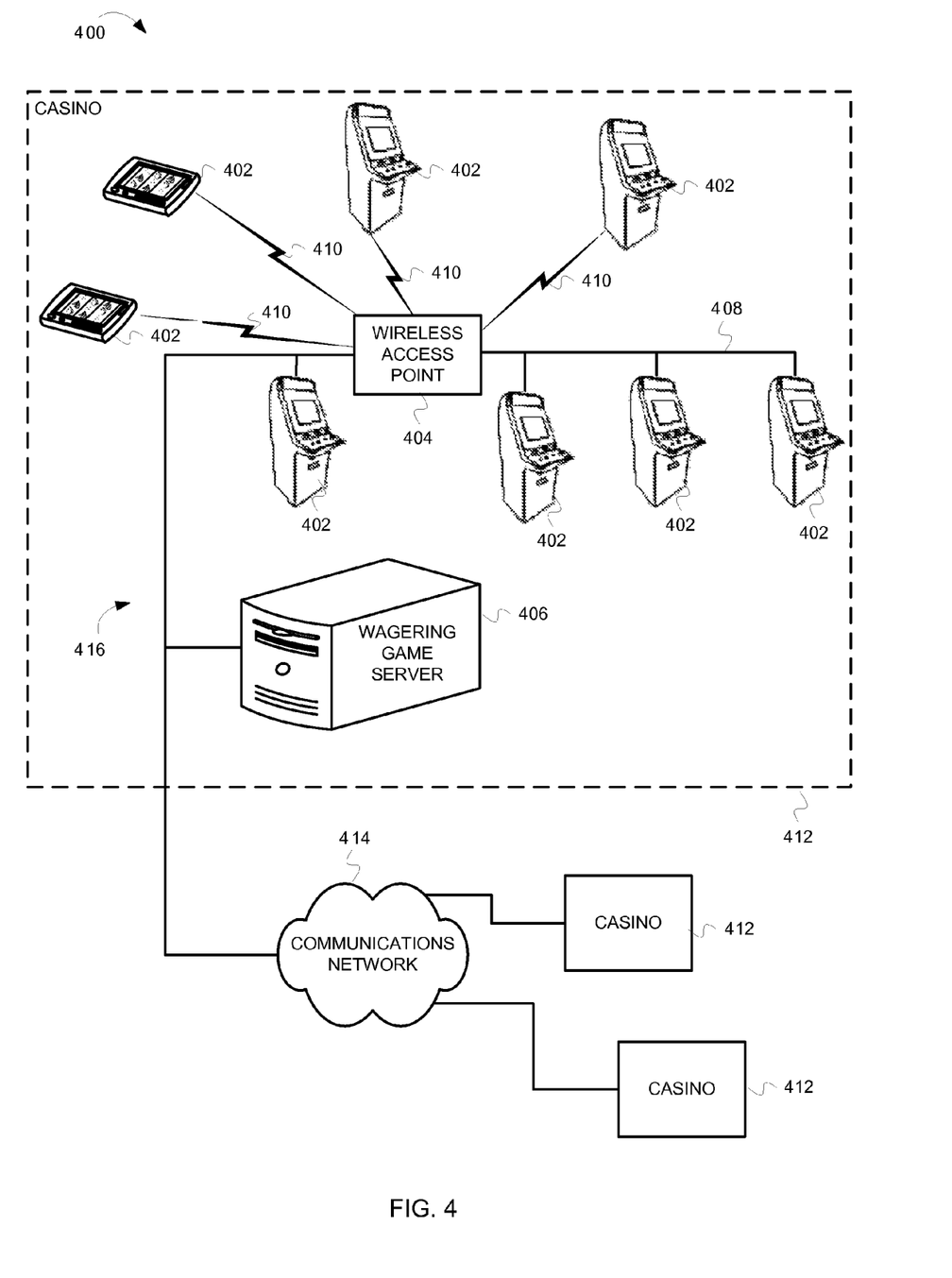
FIG. 4 is a block diagram illustrating a wagering game network 400, according to example embodiments of the invention.

As noted above, wagering game machines can operate in network environments. FIG. 4 is a block diagram illustrating a wagering game network 400, according to example embodiments of the invention. As shown in FIG. 4, the wagering game network 400 includes a plurality of casinos 412 connected to a communications network 414.

Each casino 412 includes a local area network 416, which includes an access point 404, a wagering game server 406, and wagering game machines 402. The access point 4304 provides wireless communication links 410 and wired communication links 408. The wired and wireless communication links can employ any suitable connection technology, such as Bluetooth, 802.11, Ethernet, public switched telephone networks, SONET, etc. In some embodiments, the wagering game server 406 can serve wagering games and distribute content to devices located in other casinos 412 or at other locations on the communications network 414.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

In some embodiments, wagering game machines 402 and wagering game servers 406 work together such that a wagering game machine 402 can be operated as a thin, thick, or intermediate client. For example, one or more elements of game play may be controlled by the wagering game machine 402 (client) or the wagering game server 406 (server). Game play elements can include executable game code, lookup tables, configuration files, game outcome, audio or visual representations of the game, game assets or the like. In a thin-client example, the wagering game server 406 can perform functions such as determining game outcome or managing assets, while the wagering game machine 402 can present a graphical representation of such outcome or asset modification to the user (e.g., player). In a thick-client example, the wagering game machines 402 can determine game outcomes and communicate the outcomes to the wagering game server 406 for recording or managing a player's account.

In some embodiments, either the wagering game machines 402 (client) or the wagering game server 406 can provide functionality that is not directly related to game play. For example, account transactions and account rules may be managed centrally (e.g., by the wagering game server 406) or locally (e.g., by the wagering game machine 402). Other functionality not directly related to game play may include power management, presentation of advertising, software or firmware updates, system quality or security checks, etc.

Any of the wagering game network components (e.g., the wagering game machines 402) can include hardware and machine-readable media including instructions for performing the operations described herein. For example, one or more of the wagering game machines 402 can include the processor shown in FIGS. 3A & 3B.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Any-Order Authentication

Figure 5:
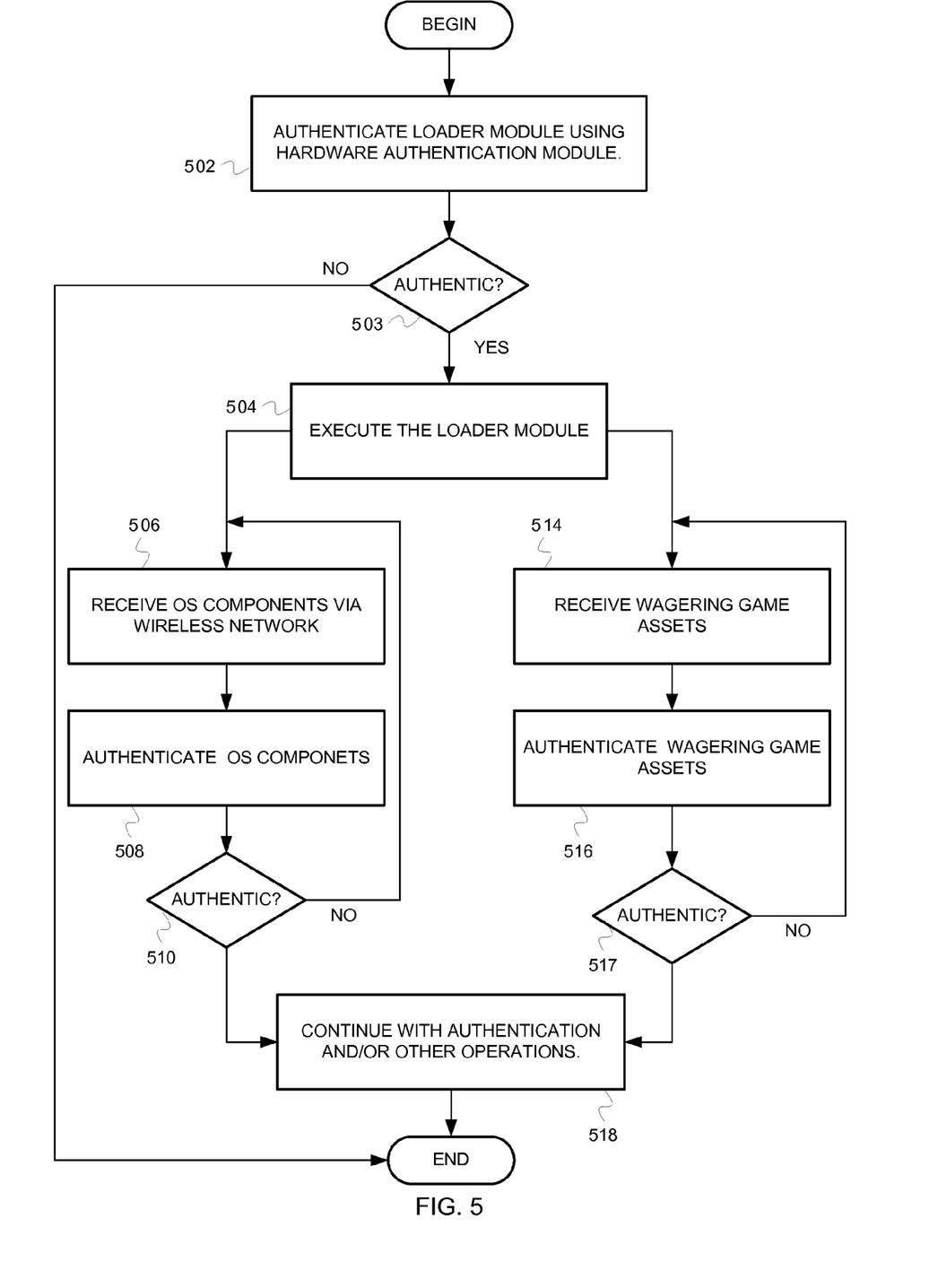
FIG. 5 is a flow diagram illustrating operations for performing any-order authentication wagering game components, according to some embodiments of the invention.

FIG. 5 is a flow diagram illustrating operations for performing any-order authentication wagering game components, according to some embodiments of the invention. The flow 500 begins at block 502.

At block 502, a wagering game machine's processor authenticates a loader module using the processor's authentication controller. In some embodiments, the loader module includes logic that enables the wagering game machine to receive components (e.g., wagering game controller, wagering game operating system, etc.) over a network, store the components, and authenticate the components. As shown in FIG. 2, the processor can store authentication keys for use by the authentication controller. In some embodiments, the processor moves the loader module and its associated authentication key into a local store (see FIG. 3) and initiates isolation mode for the local store and processing element pair. As noted above, the isolation mode prevents other components (e.g., software running on other processing elements) from accessing the loader module. While in isolation mode, the processing element's authentication controller determines a key value (e.g., a digital signature, hash value, etc.) based on the loader module's code. The authentication controller compares the newly determined key value with the authentication key stored in the local store. The flow continues at block 503.

At block 503, if the newly determined key matches one of the store authentication keys, the module is authentic and the flow continues at block 504. Otherwise, the processor halts execution and the flow ends.

At block 504, the wagering game machine's processor executes the loader module. As noted, the loader module can include logic that enables the wagering game machine to receive software components over a wagering game network. In some embodiments, after the loader module begins execution and initializes the wagering game machine to receive components over a network, the wagering game machine can authenticate software components as they are received (i.e., in any order). Because some embodiments of the processor include multiple cores (i.e., multiple local store & processing element pairs), the wagering game machine can receive and authenticate a plurality of components simultaneously. As such, the flow 500 continues in parallel at block 506 and 514.

At block 506, the wagering game machine receives operating system components over a network. The flow continues at block 508, where the wagering game machine's processor authenticates the operating system components using its native authentication controller. The flow continues at block 510. At block 510, if the processor's native authentication controller determines that the operating system components are authentic, the flow continues at block 518. If the operating system components are not authentic, the flow loops back at block 506, whereby the wagering game machine tries again to procure an authentic version of the operating system components. In some embodiments, the wagering game machine may end the flow 500 after determining that the operating system components are not authentic.

At block 514, in an execution path parallel to blocks 506-510, the wagering game machine receives wagering game assets (e.g., a wagering game controller, animation files, audio files, etc.) over a wagering game network. The flow continues at block 516, where the wagering game machine's processor authenticates the wagering game assets using its native authentication controller. The flow continues at block 510. At block 510, if the processor's native authentication controller determines that the wagering game assets are authentic, the flow continues at block 518. However, if the wagering game assets are not authentic, the flow loops back at block 514. By looping back to block 514 (and 506 in the parallel path), the wagering game machine tries again to procure an authentic version of the wagering game assets. In some instances, early authentication allows the wagering game machine to procure an authentic version of the wagering game assets before they are needed for execution. Thus, wagering game machine can avoid certain authentication-related delays. Although not shown, in some instances, if the wagering game assessts are not authentic, the wagering game machine may notify gaming operators of the authentication failure and halt operations.

At block 518, the wagering game machine continues to receive and authenticate software components and to perform other operations. From block 518, the flow ends.

Although some embodiments perform portions of the flow 500 in parallel, other embodiments can perform those operations with virtual parallelism (a.k.a., time slicing or processor sharing).

On-Demand Authentication

Figure 6A:
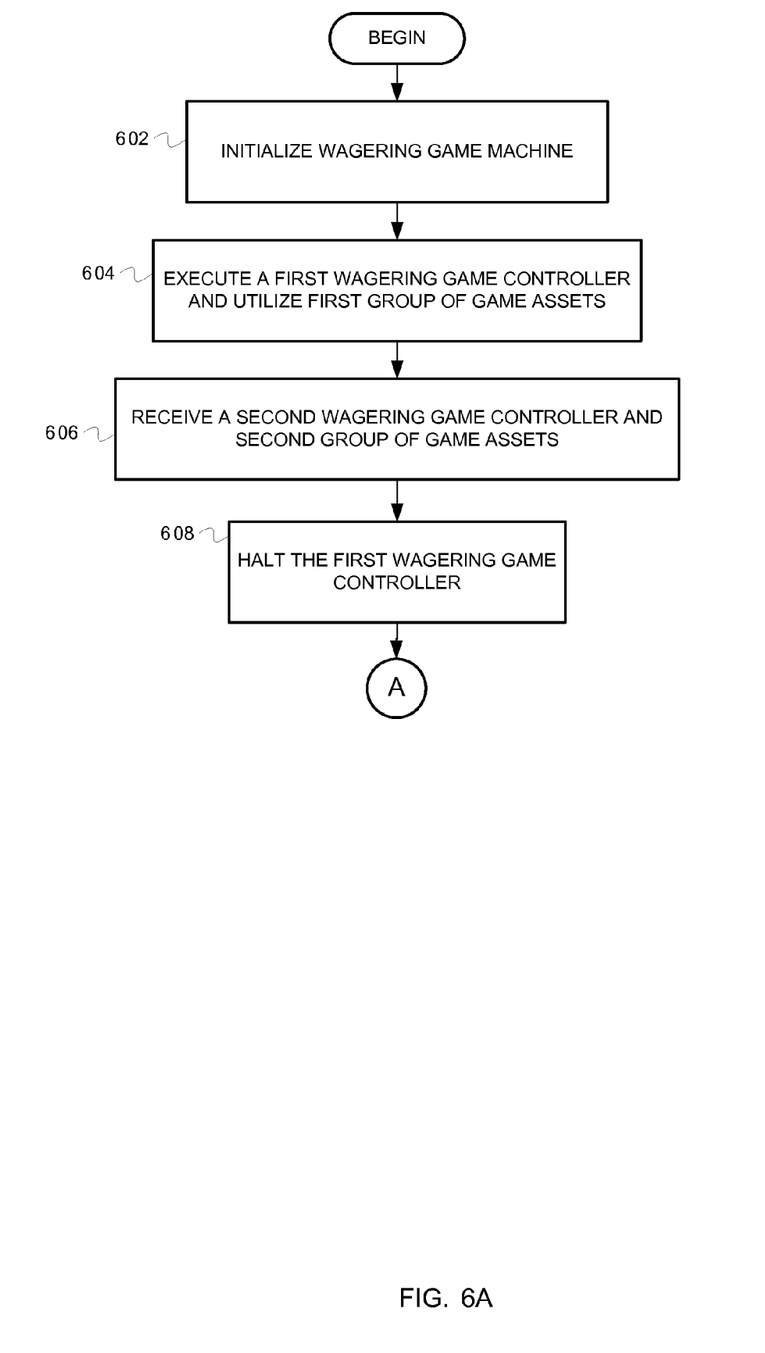
FIGS. 6A & 6B is a flow diagram illustrating operations for on-demand authentication, according to some embodiments of the invention.

FIG. 6A is a flow diagram illustrating operations for on-demand authentication, according to some embodiments of the invention. The flow begins at block 602, where a wagering game machine performs initialization operations. The initialization operations can include loading and authenticating: BIOS, an operating system, wagering game controller, wagering game assets, etc. After the wagering game machine has initialized (irrespective of the authentication used during initialization), the flow continues at block 604.

At block 604, the wagering game's processor executes a first wagering game controller and utilizes a first group of wagering game assets. By executing the first wagering game controller, the wagering game machine presents wagering games, such as video slots games.

At block 606, the wagering game machine receives a second wagering game controller and second group of game assets. As noted above, in some wagering game environments, wagering game machines constantly change games and content. The second controller may be configured to present different wagering games, such as video poker games. After receiving new software components, the wagering game machine can authenticate the new components when they execute (i.e., when they are needed or "on-demand"). The flow continues at block 608.

At block 608, the wagering game machine's processor halts execution of the first wagering game controller. The flow continues at block 610 of FIG. 6B.

Figure 6B:
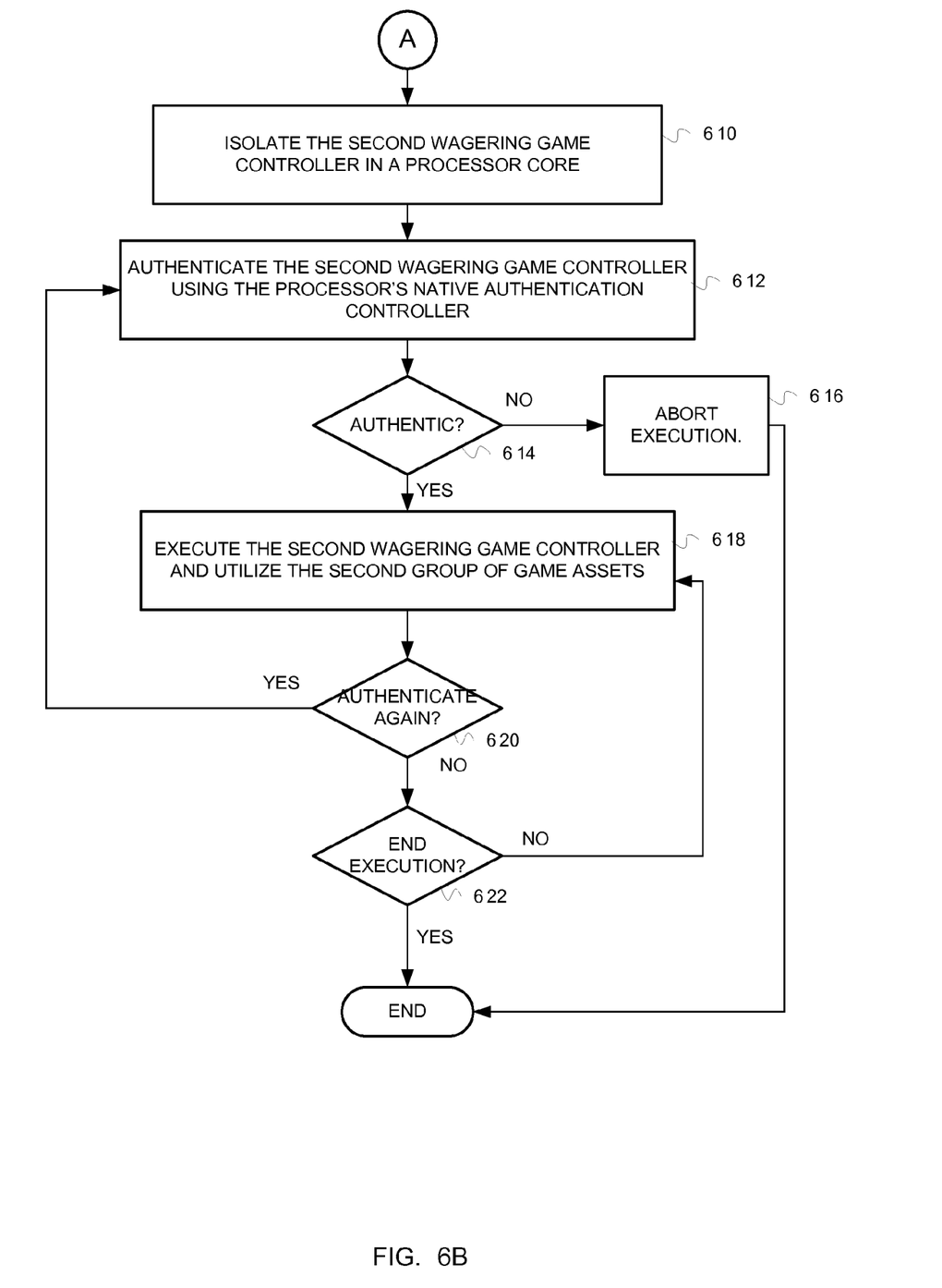

At block 610, the processor isolates the second wagering game controller in a processor core. That is, the processor loads the second wagering game controller in a local store & processing element pair and places the pair in isolation mode. Because the second wagering game controller is isolated, it cannot modify or be modified by any other software in the wagering game machine. Thus, even if the second controller contains rogue code, other system components are not at risk for attack. The flow continues at block 612.

At block 612, the processor authenticates the second wagering game controller and second group of game assets using its native authentication controller. Because the processor uses its native hardware to authenticate the second wagering game controller, the authentication is performed from a root of trust (i.e., processor hardware) that cannot be modified by rogue software. The flow continues at block 614.

At block 614, if the second wagering game controller is authentic, the flow continues at block 618. Otherwise, the flow continues at block 616, where the processor aborts execution of the second wagering game controller.

At block 618, the processor executes the second wagering game controller and utilizes the second group of game assets. In some instances, this causes the wagering game machine to present wagering games, such as video poker games. In some embodiments, the processing element & local store pair remains in isolation mode during execution of the second wagering game controller. The flow continues at block 620.

At block 620, the processor determines whether to re-authenticate the second wagering game controller and second group game assets. Because the processor has native authentication facilities, the processor can achieve a high level of trust without re-authenticating every component in the wagering game machine. Furthermore, the processor's native authentication facilities allow the wagering game machine to avoid delays associated with loading software authentication code into memory, switching contexts, interrupting the processor pipeline, and executing the software authentication code. If the processor will authenticate the second wagering game controller and game assets again, the flow continues at block 612. Otherwise, the processor continues executing the second wagering game controller until the controller ends execution (see block 622).

Encryption & Decryption

Wagering game machines use the processor's authentication hardware to limit access to decrypted wagering game software and data. In some embodiments, the processor's authentication hardware can encrypt and decrypt wagering game software and data. For example, the processor can load an encrypted wagering game software module into a processor core (i.e., local store & processing elements pair) and enter isolation mode. While in isolation mode, the processing element can decrypt the wagering game software using the authentication hardware. While in isolation mode, the decrypted wagering game software (e.g., wagering game controllers) and data (e.g., authentication keys) will not be accessible to other components. If the wagering game software component needs to make data available to other components, the authentication hardware can re-encrypt the data for use outside the isolation mode. Thus, wagering game machines do not have to expose unencrypted wagering game software and data to other software components, such as software authenticators.

More About Wagering Game Machines

Figure 7:
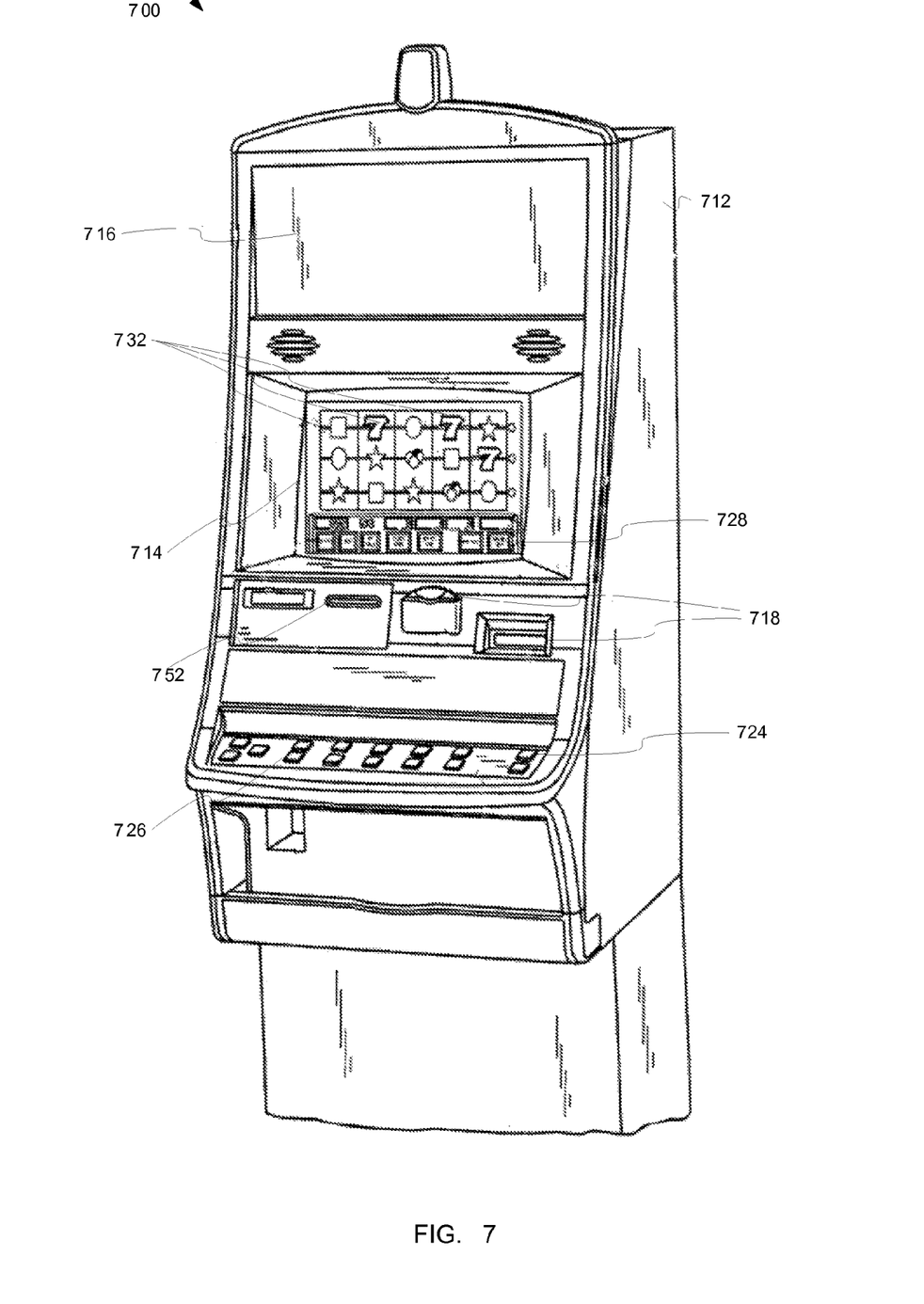
FIG. 7 is an isometric view of a wagering game machine, according to example embodiments of the invention.

FIG. 7 is an isometric view of a wagering game machine, according to example embodiments of the invention. Referring to FIG. 7, a wagering game machine 700 can be used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for authenticating wagering game modules in a wagering game machine that includes a processor having authentication hardware configured to authenticate wagering game software, the method comprising:

authenticating, using the authentication hardware, a loader module, wherein the loader module is configured to enable the wagering game machine to receive at least one other module over a network;

configuring, by executing the loader module, the wagering game machine to receive the at least one other module over the network;

receiving, under control of the loader module, a first wagering game controller module configured to present wagering games during execution on the wagering game machine;

determining, using the authentication hardware, that the first wagering game controller module is not authentic, the determining occurring before the wagering game machine includes an operating system and the at least one other module required for presentation of the wagering games;

requesting, under control of the loader module, a second wagering game controller module before receipt of the operating system and the at least one other module required for presentation of the wagering games;

receiving the second wagering game controller module, wherein the second wagering game controller module is configured to present the wagering games during execution on the wagering game machine;

determining, using the authentication hardware, that the second wagering game controller module is authentic;

determining, using the authentication hardware, that the at least one other module is authentic; and executing the operating system, the at least one other module, and the second wagering game controller module.

2. The method of claim 1, wherein the loader module is not part of the wagering game operating system.

3. The method of claim 1, wherein the first wagering game controller module is received from one of a wagering game server and another wagering game machine.

4. The method of claim 3, wherein the receiving of the first wagering game controller module and the receiving of the second wagering game controller module overlap in time.

5. The method of claim 1, wherein the authentication hardware includes, before receipt of the first wagering game controller module, one or more authentication keys associated with the first wagering game controller module and the second wagering game controller module.

6. A wagering game machine comprising:
a processor having authentication hardware configured to
authenticate, using the authentication hardware, a loader module, wherein the loader module is configured to enable the wagering game machine to receive at least one other module over a network,
configure, by executing the loader module, the wagering game machine to receive the at least one other module over the network,
receive, under control of the loader module, a first wagering game controller module configured to present wagering games during execution on the wagering game machine,
determine, using the authentication hardware, that the first wagering game controller module is not authentic, the determining occurring before the wagering game machine includes an operating system and the at least one other module required for presentation of the wagering games,
request, under control of the loader module, a second wagering game controller module before receipt of the operating system and the at least one other module required for presentation of the wagering games,
receive the second wagering game controller module, wherein the second wagering game controller module is configured to present the wagering games during execution on the wagering game machine,
determine, using the authentication hardware, that the second wagering game controller module is authentic,
determine, using the authentication hardware, that the at least one other module is authentic, and
execute the operating system, the at least one other module, and the second wagering game controller module.

7. A non-transitory, machine-readable storage medium having instructions stored thereon which, when executed by a processor of a wagering game machine, cause the wagering game machine to perform operations comprising:
authenticating, using authentication hardware of the processor, a loader module, wherein the loader module is configured to enable the wagering game machine to receive at least one other module over a network;
configuring, by executing the loader module, the wagering game machine to receive the at least one other module over the network;
receiving, under control of the loader module, a first wagering game controller module configured to present wagering games during execution on the wagering game machine;
determining, using the authentication hardware, that the first wagering game controller module is not authentic, the determining occurring before the wagering game machine includes an operating system and the at least one other module required for presentation of the wagering games;
requesting, under control of the loader module, a second wagering game controller module before receipt of the operating system and the at least one other module required for presentation of the wagering games;
receiving the second wagering game controller module, wherein the second wagering game controller module is configured to present the wagering games during execution on the wagering game machine;
determining, using the authentication hardware, that the second wagering game controller module is authentic;
determining, using the authentication hardware, that the at least one other module is authentic; and
executing the operating system, the at least one other module, and the second wagering game controller module.

* * * * *